May 23, 1950 P. J. BROUWER 2,509,128
ROTOR FOR ROTOR SUSTAINED AIRCRAFT
Filed Jan. 12, 1945 3 Sheets-Sheet 2
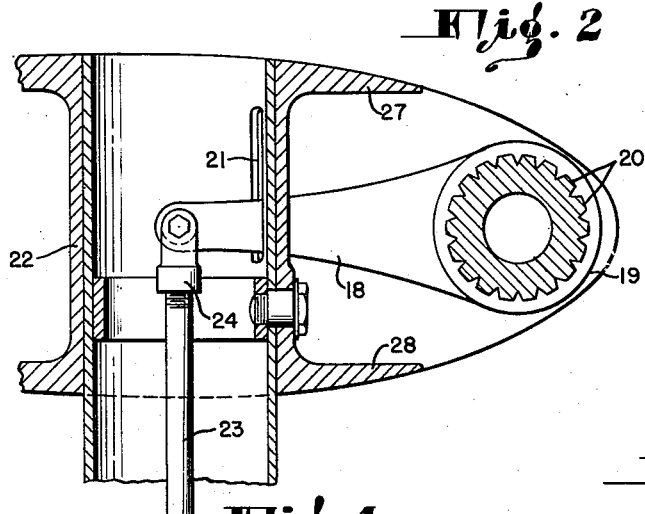
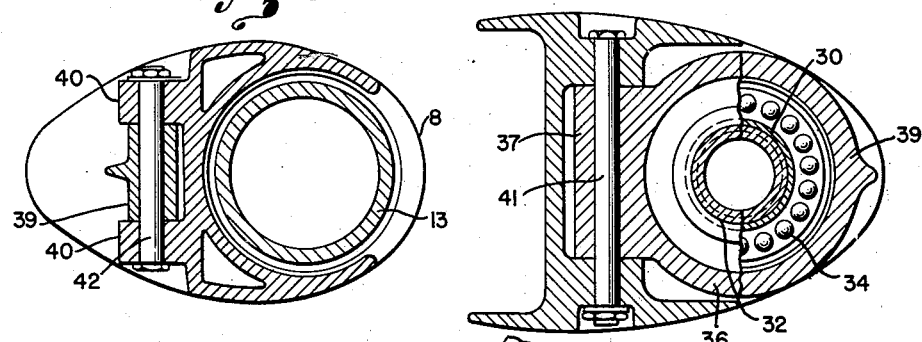
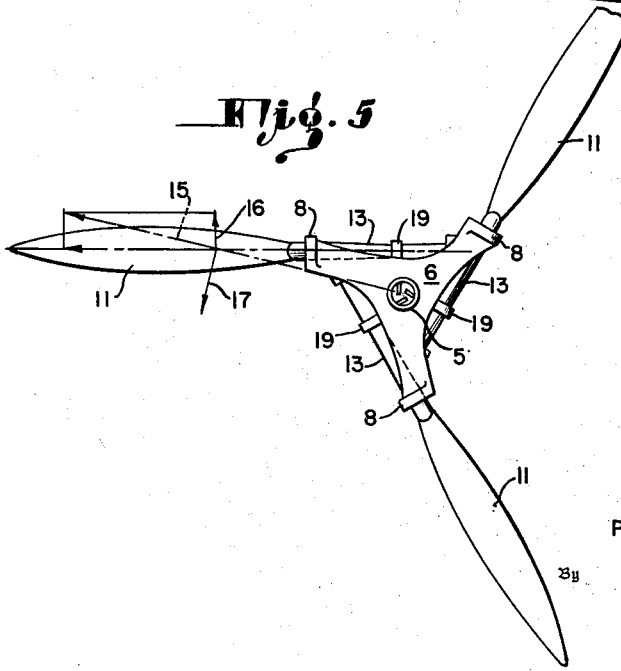
Inventor
PIETER J. BROUWER
Attorney May 23, 1950 P. J. BROUWER 2,509,128
ROTOR FOR ROTOR SUSTAINED AIRCRAFT
Filed Jan. 12, 1945 3 Sheets-Sheet 3
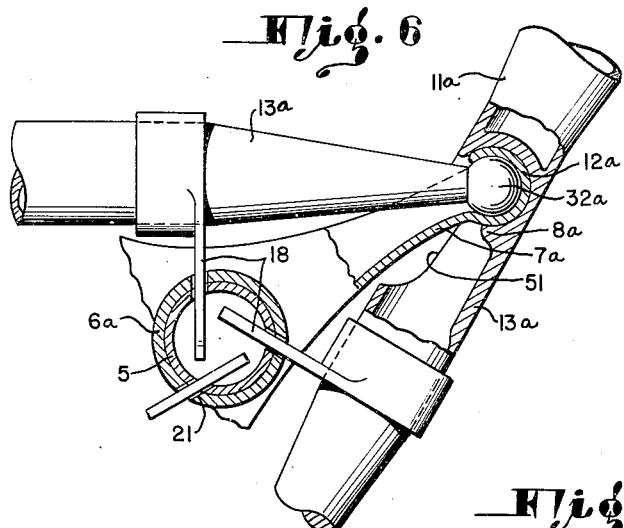
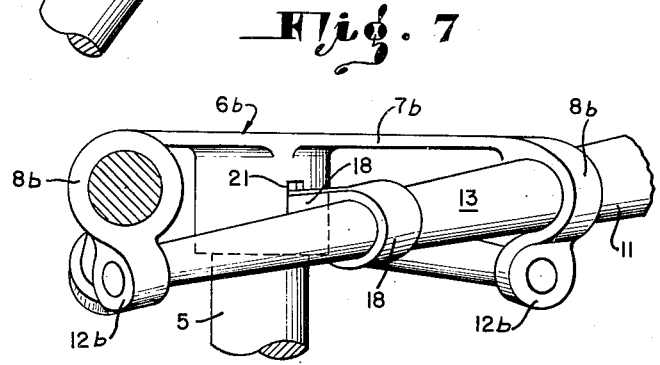
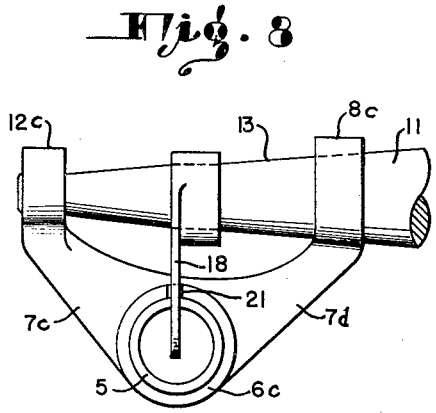
INVENTOR.
PIETER J. BROUWER
BY
ATTORNEY Patented May 23, 1950

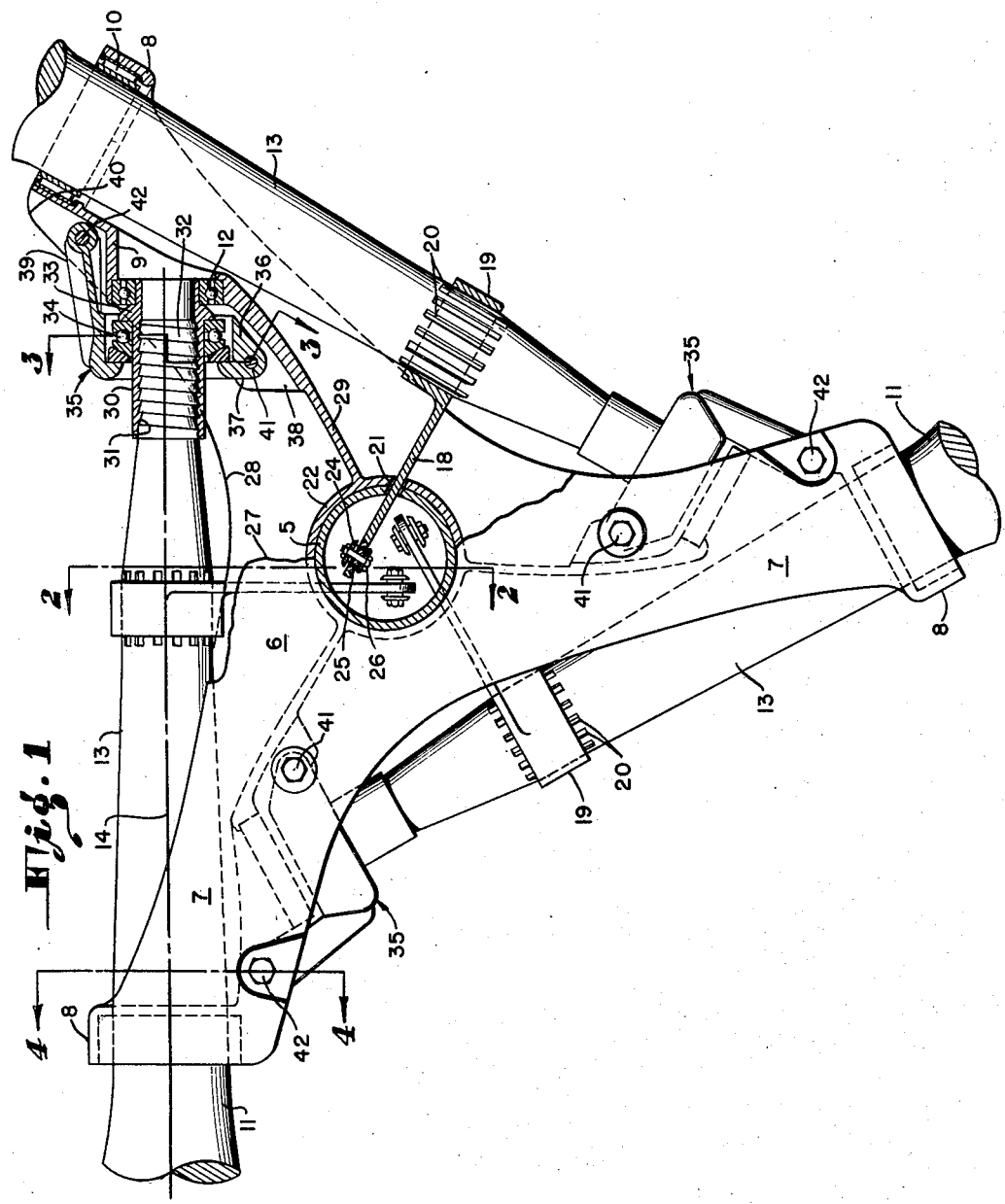

2,509,128

UNITED STATES PATENT OFFICE 2,509,128

ROTOR FOR ROTOR SUSTAINED AIRCRAFT

Pieter J. Brouwer, Los Angeles, Calif., assignor to Gilbert W. Magill, Los Angeles, Calif.

Application January 12, 1945, Serial No. 572,595

9 Claims. (Cl. 170—160)

This invention relates to helicopters, and has as its general object to provide an improved helicopter rotor of the type in which the angle of the blades is adapted to be changed during operation thereof so as to effect feathering and paddling movements which are utilized in stabilizing and controlling the operation of the helicopter.

One useful application of the invention is in a tandem rotor helicopter of the general type disclosed in the abandoned application of Gilbert W. Magill, Serial No. 505,564, filed October 8, 1943, although the invention may be applied as well to other helicopters such as, for example, a single rotor or a co-axial rotor type helicopter.

The adjustment of blade angle in a helicopter rotor during flight operation may be utilized for a number of purposes. By controlling the blades in such a manner that the blade which is moving rearwardly with reference to the direction of flight assumes a position transverse to the general plane of rotation of the rotor while the blade moving forwardly with reference to the line of flight assumes a position lying more nearly in the rotor plane, the rotor may be caused to "paddle" the craft forwardly in the air. When a blade on one side of the ship assumes an angle of greater lift than a blade on the other side, a tendency of the ship to roll or tilt around its longitudinal axis may be counteracted. A blade moving laterally on the forward side of the rotor may be caused to "paddle" while a blade moving laterally in the opposite direction on the rear side of the rotor may be given a feathered position, in order to give the craft a sidewise movement or a component of sidewise movement. It may be desirable to change the angle of all of the blades of the rotor simultaneously so as to vary the effective lift of the rotor. Various combinations of these adjustments may become desirable under varying conditions of flight.

To achieve either simultaneous or independent adjustment of the blades of a helicopter rotor requires a control mechanism which is closely coordinated with the shaft on which the blades are mounted for rotation. Where provision is to be made for the independent control of the several blades of two rotors arranged in tandem, it is desirable to provide means for interlinking the control of one rotor with the control of the other and since a substantial proportion of the rotor shaft will ordinarily project above the fuselage of the helicopter and it is preferable to have the interlinking control mechanism located within the fuselage, it is desirable to bring the control mechanism from the blades down along the rotor shaft and to connect such control mechanism with interlinking control mechanism which bridges across between the lower portions of the rotor shaft.

In order to reduce aerodynamic drag and to protect the vertically extended control members against damage from the weather and other causes, I propose to employ an arrangement in which these control members are housed within the rotor shaft, which is made tubular for that purpose, as well as to achieve maximum strength coupled with minimum weight.

In order to translate the longitudinal movement of a control member such as a rod extending vertically through the tubular rotor shaft, into oscillatory movement of the rotor blades, the invention contemplates the use of a crank arm on the blade. This involves a problem of avoiding complications which would arise from attempting to connect up the end of such a crank arm (which, with the rotor blade arranged conventionally with its axis intersecting that of the rotor shaft, would project radially outwardly from the rotor shaft) with the control rod coming up through the rotor shaft. One of the objects of the invention is to provide a rotor hub of such construction and arrangement as to permit the use of a relatively simple operating linkage in which a crank arm, secured to the shank of a rotor blade, is connected directly to the control rod coming upwardly through the rotor shaft, and in which no intermediate linkage is required.

Another object of the invention is to provide a rotor hub having maximum strength coupled with minimum size, in order to reduce weight and aerodynamic drag to a minimum.

Having in mind the foregoing objects, the invention provides a rotor hub assembly in which the rotor blades are arranged tangentially with the shanks thereof arranged to define the perimeter of a polygon (an equilateral triangle where there are three blades) with the several crank arms extending inwardly and terminating above the tubular rotor shaft, and with the distance from the axis of rotation to the outermost extremities of the hub being less than the distance between the bearing points where the load of the helicopter is transferred from the hub to the blades.

A further object of the invention is to provide a helicopter rotor, in which the weight of the hub is reduced by balancing the down load on the end of one blade shank against the upload at an intermediate point in an adjacent shank.

A further object is to provide an open hub construction which improves the accessibility to the parts thereof.

Another object of the invention is to provide a helicopter rotor in which the bending moments on the blades in the plane of the rotor are reduced by balancing a component of centrifugal force against a portion of the drag load on each blade.

Further objects and advantages of the invention will be brought out in the following part of the specification.

Referring to the drawings which are for illustrative purposes only,

Fig. 1 is a plan view, partially in section, of a helicopter rotor hub embodying the invention;

Fig. 2 is a vertical axial sectional view of a portion thereof, taken on the line 2—2 of Fig. 1;

Fig. 3 is a sectional view taken on the line 3—3 of Fig. 1;

Fig. 4 is a sectional view taken on the line 4—4 of Fig. 1;

Fig. 5 is a plan view and stress diagram of the rotor;

Fig. 6 is a fragmentary plan view, partially in section, of a portion of a rotor embodying a modification of the invention;

Fig. 7 is a side elevation, partially in section, of a rotor hub embodying another modification of the invention; and Fig. 8 is a plan view of a rotor, but embodying a further modification of the invention.

As an example of one form in which the invention may be embodied, I show in the drawings the hub assembly of a helicopter rotor attached to the upper end of a tubular shaft 5. In plan form the hub 6 is star-shaped, with three arms 7, each terminating at its outer end in a bearing collar 8, and each having a laterally directed bearing boss 9. Each collar 8 is supported, through the medium of a needle bearing 10, on an intermediate portion of a rotor blade 11, the shank end of which is supported through the medium of an anti-friction bearing 12, in the bearing boss 9 of an adjacent arm 7.

The shank portions 13 of the three rotor blades 11 are thus arranged so as to define an equilateral triangle, and the axes 14 of the blades are tangent to a circumference of the rotor axis having a substantial radius. The blades 11 extend tangentially from the hub. Because of this tangential arrangement of the blades, centrifugal pull against the blades when they are rapidly rotating, acting radially, as indicated by the vector line 15 in Fig. 5, will have a circumferential component which is indicated at 16, and this component will partially balance the aerodynamic drag against the blades, indicated by the arrow 17.

The blades 11 are rotatable in the bearings 10 and 12 in order that their angles of attack may be changed to properly control the operation of the helicopter. So as to adjust and hold the respective blades in their adjusted positions, there is attached to each shank 13 a crank arm 18. Each crank arm 18 has a collar 19 provided with internal splines meshing with splines 20 in the respective shanks 13. The shanks 13 are tapered to permit the collars 19 to be slipped over the ends thereof into engagement with the splines 20. The taper has the additional purpose of streamlining the shanks 13 down to minimum weight, while preserving the most efficient lever arm shape for maximum strength where strength is needed.

The shanks 13 are situated at a sufficient radial distance from the axis of rotation so that the crank arms 18 may have adequate length and yet terminate within the tubular shaft 5. The crank arms are extended into the shaft 5 through vertical slots 21 in the shaft 5 and in the central collar portion 22 of the hub 6, by means of which the hub is attached to the shaft 5. Each crank arm 18 is connected at its inner end to a control rod 23 by means of a yoke 24 attached to the upper end of the rod, a bearing 25 mounted in an aperture in the end of the crank arm 18, and a pintle bolt 26 extending through the yoke 24 and through the bearing 25.

The crank arms 18 are offset from the rotor axis. This makes it possible to extend the arms 18 beyond the rotor axis so as to achieve maximum length in proportion to the distance between the blade axis and the rotor axis, and so as to permit the control rods 24 to be properly spaced from each other within the shaft 5.

The hub spider 6 has top and bottom flanges 27 and 28 respectively, the central sleeve 22, and web portions 29 connecting the flanges 27 and 28. In the arm 7 the cross-sectional shape is substantially that of an I-beam as shown in Fig. 3. The bosses 9 are formed in the web portion 29. Collars 8 are formed as extensions of the flanges 27 and 28.

At the end of each shank 13 is a ferrule 30 which has an internal buttress type thread 31, into which the reduced threaded end 32 of the shank 13 is threaded. The ferrule 30 is provided with an annular radially outwardly extending shoulder 33, which abuts a thrust bearing 34. The end thrust developed in the rotor blades by centrifugal force is transmitted from the shoulder 33 through the thrust bearing 34 to a bracket 35 having a collar portion 36 in which the bearing 34 is received, having an apertured lug 37 extending between bosses 38 which are built up from the flanges 27 and 28, and having an arm 39 extending between thickened portions 40 of the flanges 27 and 28 near the outer end of the arm 7, bolts 41 and 42 being extended through the lug 37 and bosses 38 and arm 39 and flange portions 40 in order to secure the bracket 35 to the arm 7.

Each bearing 12 takes a down load from the end of its associated blade shank 13, while the adjacent bearing 10 takes an up load from the intermediate region of the adjacent shank 13. The down load on the bearing 12 partially balances the up load on the bearing 10, and, as a result, the bending moment upon the arm of the hub spider is considerably reduced, below that which would be applied to a hub spider by rotor blades disposed radially. This makes it possible to employ a lighter hub spider than would be required in a radial blade arrangement.

The balancing of the upload on the bearing 8 against the download on the bearing 12 is through the portion of the arm 7 connecting these bearings, and in order that the bending moment on this portion may be reduced to a minimum, the two bearings are located as closely together as is practicable.

The triangular arrangement of blade shanks makes it possible to extend each blade shank considerably past the rotor axis, and, consequently, to locate the outer bearing 10 considerably closer to the rotor axis than would be necessary in a radial blade arrangement, to obtain the same distance between outer and inner bearings. Thus the invention provides for a spider having arms of minimum length, other factors being equal, and thus contributes to the reduction in weight, provides a more compact and sturdy arrangement, and reduces aerodynamic drag.

With reference to Figs. 2, 3, and 4, it should be noted that the flanges 27 and 28 are fitted around the shanks 13 in such a manner that the assembled hub is substantially streamlined in the various circumferential cross sections through the arms 7.

The invention provides an open hub construction which improves the accessibility to the parts thereof. Reference is here made to the structural or load bearing portions of the hub for the purpose of reducing aerodynamic drag. However, it will be desirable to cover this open hub structure with a light sheet metal cover of streamlined cross section, which may be easily attached to or detached from the basic hub structure.

The bearings 8 and 34 may be combined in a single bearing as shown in Fig. 6. In this modification of the invention, the blades 11a are hollow and have hollow shanks 13a which are provided with spherical bearing portions 8a, and are cut away as at 51 to receive the arms 7a of the hub spider. The arms 7a are provided at their ends with spherical bearing portions 12a which are socketed in the bearing portions 8a. The blade shanks 13a are provided at their ends with spherical bearing portions 32a which are socketed in the bearing portions 12a. This universal bearing connection between the spider 7a, the intermediate portion of one blade shank 13a and the end portion of another blade shank 13a permits the relative rotation of both blade shanks with reference to the spider 7a.

In Fig. 7 I have shown another modification of the invention, in which each bearing 12b is located directly below its associated bearing 8b. This arrangement may be employed where a coning angle is given to the rotor blades. The arms 7b of the hub spider 6b are modified to accommodate this modified arrangement of the bearings.

In Fig. 8 I have shown another modification of the invention, applied to a single bladed rotor, in which the hub spider 6c has arms 7c and 7d provided respectively with bearings 12c and 8c in which the shank 13 of the blade 11 is mounted. The control arm 18 may, in this instance, be arranged to intersect the axis of the rotor shaft 5. The offset arrangement of the blades is particularly advantageous in a single bladed rotor, as it adds stability to the operation of such a rotor.

I claim as my invention:

1. In a rotor for rotor sustained aircraft including a plurality of blades having shanks that are spaced radially from the rotor axis and arranged to collectively define the perimeter of a polygon the center of which lies at the rotor axis with the blades extending tangentially therefrom; a hub and spider including a plurality of radiating arms each having a pair of coaxial adjacent bearings one of which is an end thrust bearing taking the centrifugal load of a respective blade at the end of the shank thereof and the other of which constitutes a journal support for said shank end, and each arm having a third bearing, aligned with the coaxial adjacent bearings of another arm, with the shank of another blade journalled therein each arm including integral means securely connecting said bearings together for directly balancing the thrust on said end thrust bearing against the load on said third bearing.

2. In a rotor for rotor sustained aircraft including a plurality of blades having shanks that are spaced radially from the rotor axis and arranged to collectively define the perimeter of a polygon the center of which lies at the rotor axis with the blades extending tangentially therefrom, each shank being provided at its end with a trunnion and, adjacent said trunnion, with a shoulder facing toward the blade tip; a hub and spider including a plurality of radiating arms each having an end bearing in which the end trunnion of a respective blade is journalled, and each having a second bearing aligned with the end bearing of another arm, in which the shank of another blade is journalled, and a third bearing detachably attached to each arm, adjacent to and coaxial with the end bearing thereof, positioned intermediate said adjacent end bearing and the aligned second bearing, and arranged to take the centrifugal end thrust of the corresponding blade each arm including integral means securely connecting said bearings together for directly balancing the thrust on said end thrust bearing against the load on said third bearing.

3. In a rotor for rotor sustained aircraft including a plurality of blades having shanks that are spaced radially from the rotor axis and arranged to collectively define the perimeter of a polygon the center of which lies at the rotor axis with the blades extending tangentially therefrom; each shank being provided at its end with a trunnion and, adjacent said trunnion, with a shoulder facing toward the blade tip; a hub and spider including a plurality of radiating arms each having an end bearing in which the end trunnion of a respective blade is journalled and each having a second bearing, aligned with the end bearing of another arm, in which the shank of another blade is journalled; a bracket detachably secured to each arm intermediate the end thrust bearing thereof and the aligned second bearing of another arm, said bracket having an opening through which the shank of a respective blade extends, and an end thrust bearing engaged between said bracket and the shoulder of the shank that extends through said bracket each arm including integral means securely connecting its bearings together for directly balancing the thrust on said end thrust bearing against the load on said second bearing.

4. In a rotor for rotor sustained aircraft including a plurality of blades having shanks that are spaced radially from the rotor axis and arranged to collectively define the perimeter of a polygon the center of which lies at the rotor axis with the blades extending tangentially therefrom, each shank being provided at its end with a trunnion and, adjacent said trunnion, with a shoulder facing toward the blade tip, a hub and spider including a plurality of radiating arms each having an end bearing in which the end trunnion of a respective blade is journalled, each having a second bearing aligned with the end bearing of another arm and through which extends the shank which is journalled in the end bearing of the last mentioned arm; a bracket detachably secured to each arm adjacent and parallel to the end bearing thereof, and having an opening coaxial with said end bearing, through which the respective shank extends; an end thrust bearing mounted upon each blade shank and engaged against the shoulder thereof, and a self-aligning thrust connection between each end thrust bearing and the adjacent bracket each arm including integral means securely connecting its bearings together for directly balancing the thrust on said end thrust bearing against the load on said second bearing.

5. In a rotor for rotor sustained aircraft including a plurality of blades having shanks that are spaced radially from the rotor axis and arranged to collectively define the perimeter of a polygon the center of which lies at the rotor axis with the blades extending tangentially therefrom, each shank being provided at its end with a trunnion and, adjacent said trunnion, with a shoulder facing toward the blade tip; a hub and spider including a plurality of radiating arms each having an end bearing in which the end trunnion of a respective blade is journalled, and each arm having a second bearing aligned with the end bearing of another arm and through which extends the shank that is journalled in the last mentioned end bearing; each arm including a pair of spaced flanges embracing the end bearing thereof; an end thrust bracket embraced between the flanges of each arm and detachably secured thereto, said end thrust bracket being disposed in adjacent spaced relation to the end thrust bearing of its respective arm and having an opening through which is extended the shank that is journalled in the last mentioned end bearing; and a thrust bearing carried upon said last mentioned shank and interposed between said bracket and the adjacent end bearing.

6. In a rotor for rotor sustained aircraft including a plurality of blades having shanks that are spaced radially from the rotor axis and arranged to collectively define the perimeter of a polygon the center of which lies at the rotor axis with the blades extending tangentially therefrom, each shank being provided at its end with a removable ferrule having an end trunnion and, adjacent to said trunnion, a flange; a hub and spider including a plurality of radiating arms each having a pair of spaced flanges and a web portion between said flanges; an end bearing mounted in the web portion of each arm, the trunnion of a respective blade shank being journalled therein; a second bearing carried by each arm and aligned with the end bearing of another arm, said second bearing having journalled therein the shank that is journalled in the aligned end bearing; an end bracket embraced between the flanges of each arm, securing elements extended through said flanges and through the ends of said bracket, said bracket having a portion disposed in spaced parallel and adjacent relationship to a respective end bearing and having an opening through which a respective shank extends; and an end thrust bearing interposed between said bracket and the shoulder of the respective blade shank.

7. A rotor as defined in claim 5, including a sleeve in which said trunnion and shoulder are integrally formed, said sleeve having internal threads and said shank having a threaded end portion threaded into said sleeve.

8. In a rotor for rotor sustained aircraft, including a plurality of blades having shanks that are spaced radially from the rotor axis and arranged to collectively define the perimeter of a polygon the center of which lies at the rotor axis with the blades extending tangentially therefrom; a hub and spider including a plurality of radiating arms each having an end thrust bearing taking the centrifugal load of a respective blade at the end of a shank thereof and each having a second bearing in which the shank of another blade is journalled, said end thrust bearing and second bearing being closely adjacent each other and each arm including integral means securely connecting its bearings together for directly balancing the thrust on said end thrust bearing against the load on said second bearing, each of said arms including a vertical web portion and horizontal flanges projecting radially outwardly from said web portion, said web portion and flanges defining a channel in which a respective shank is partially received, a supporting ring for said second bearing, with which the outer end extremities of said web and flange merge, and a supporting ring for said end thrust bearing, formed in said web portion intermediate said end thrust bearing and said hub.

9. A rotor as defined in claim 8, wherein the flanges of adjacent arms are joined together to form continuous arcuate bracing means interconnecting the respective arms.

PIETER J. BROUWER.

REFERENCES CITED

The following references are of record in the file of this patent:

UNITED STATES PATENTS

| Number | Name | Date |
| --- | --- | --- |
| 2,037,251 | Mansson | Apr. 14, 1936 |
| 2,080,522 | Wilford | May 18, 1937 |
| 2,352,342 | Pitcairn | June 27, 1944 |
| 2,352,404 | Pitcairn | June 27, 1944 |